March 21, 1967 J. R. SNEAD 3,310,632

FM STEREO MULTIPLEX DOUBLING CIRCUIT

Filed Aug. 23, 1963

INVENTOR.
John R. Snead

BY

Robert E. Fowler
ATTORNEY

United States Patent Office 3,310,632
Patented Mar. 21, 1967

3,310,632

FM STEREO MULTIPLEX DOUBLING CIRCUIT

John R. Snead, Kokomo, Ind., assignor to General Motors Corporation, Detroit, Mich., a corporation of Delaware Filed Aug. 23, 1963, Ser. No. 304,198
1 Claim. (Cl. 179—15)

This invention relates to stereo multiplex circuitry for developing high fidelity audio stereo signals from single carrier radio transmission. More particularly it relates to a simplified circuit for recovering the information in the sidebands of a suppressed 38 kc. modulated carrier.

In stereo systems it is necessary to produce, transmit, receive and detect a plurality of signals simultaneously both modulated and both originating at a common audible source but indicative of different initiating positions of sound. These are usually referred to by the terms the L & R channels as defining what would be heard by the left and right ear of the listener had he been present at the original program which is being transmitted. There are many ways in which the two separate modulated carriers may be transmitted. One way of getting extra channels of a program over a single carrier radio transmission is known as multiplex. This is a popular method.

In multiplex systems a modulated subcarrier is used to convey one channel. At the transmitter this is combined with the other audio channel modulation and the combination modulates the regular carrier. Thus the subcarrier is suppressed in the regular transmission. It must be recovered at the receiver and both modulated signals developed into two full channel signals.

It is, therefore, an object in making this invention to provide a simple stereo multiplex recovery circuit.

It is a further object in making this invention to provide a simplified stereo circuit for the recovery of the information contained in the sidebands of the suppressed 38 kc. carrier.

It is a still further object in making this invention to furnish a circuit utilizing a single transistor for doubling a 19 kc. pilot carrier to recover the 38 kc. suppressed modulated carrier for stereo reception, and simultaneously add the recovered 38 kc. carrier to its sidebands.

With these and other objects in view which will become apparent as the specification proceeds, my invention will be best understood by reference to the following specification and claim and the illustrations in the accompanying drawings, in which:

Figure 1:
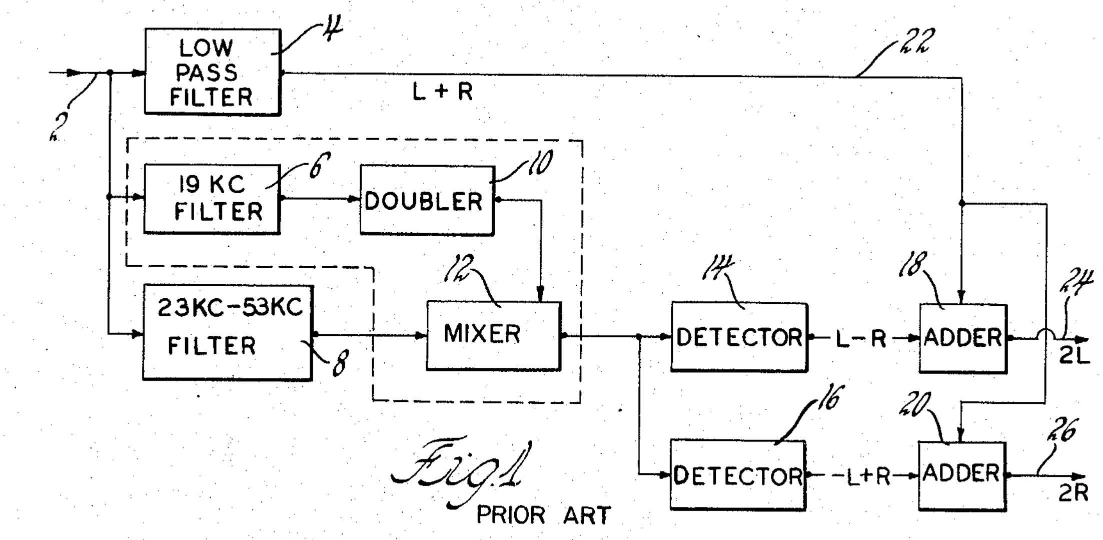
Fig. 1 PRIOR ART
FIGURE 1 is a block diagram of a portion of a conventional stereo multiplex system for detecting the R and L signals.

As previously explained, in general in multiplex systems the transmitted carrier is modulated with a combination of a first audio program and a subcarrier modulated by a second audio program. FIG. 1 illustrates a conventional system for detecting and developing the two programs for stereo listening. The output from the radio frequency detecting section (not shown) is fed in on line 2. Normally this signal would be simultaneously applied to a low pass filter 4, a 19 kc. filter 6 for taking off the pilot signal which is used in the regeneration of the suppressed carrier and to an amplifier and filter 8 for passing 23 kc.–53 kc. and sidebands of the 38 kc. suppressed carrier. Through this system the signal applied to the low pass filter 4 takes off all frequencies below 15 kc., blocking signals having frequencies 15 kc.–50 kc. and is modulated with L+R program. The next section 6 filters off the 19 kc. pilot carrier which is then fed into a frequency doubler section 10 to restore the 38 kc. suppressed carrier. The output of the frequency doubler 10 is fed into a mixer section 12 which is also connected to the output of the filter 8. The mixer section 12 combines the outputs of the frequency doubler 10 and the filter 8 to restore the 38 kc. suppressed carrier and its sidebands so they can be demodulated to provide the desired audio signals.

The output of the mixer section 12 is, therefore, fed into two separate detection units 14 and 16 to develop the sum and difference signals from the program channels. The resultant signal from detector unit 14 will be L−R and that from detector unit 16 −L+R as indicated on the drawing. Each of these signals is applied to an adder unit identified as 18 and 20, respectively. The output of the low pass filter section 4 is also applied through line 22 independently to both adder units 18 and 20. The combination of the detector 14 and low pass filter in adder 18 produces, $$\begin{array}{c} L+R \\ L-R \\ \hline 2L \end{array}$$

and the left program is applied to line 24 which may be fed into suitable loudspeakers (not shown). In similar manner the two signals combined in adder 20 are, $$\begin{array}{c} L+R \\ -L+R \\ \hline 2R \end{array}$$

so that the right program appears on line 26. This is the conventional recovery and detecting system for stereo on single carrier radio transmission or multiplexing.

Figures 2, 3:
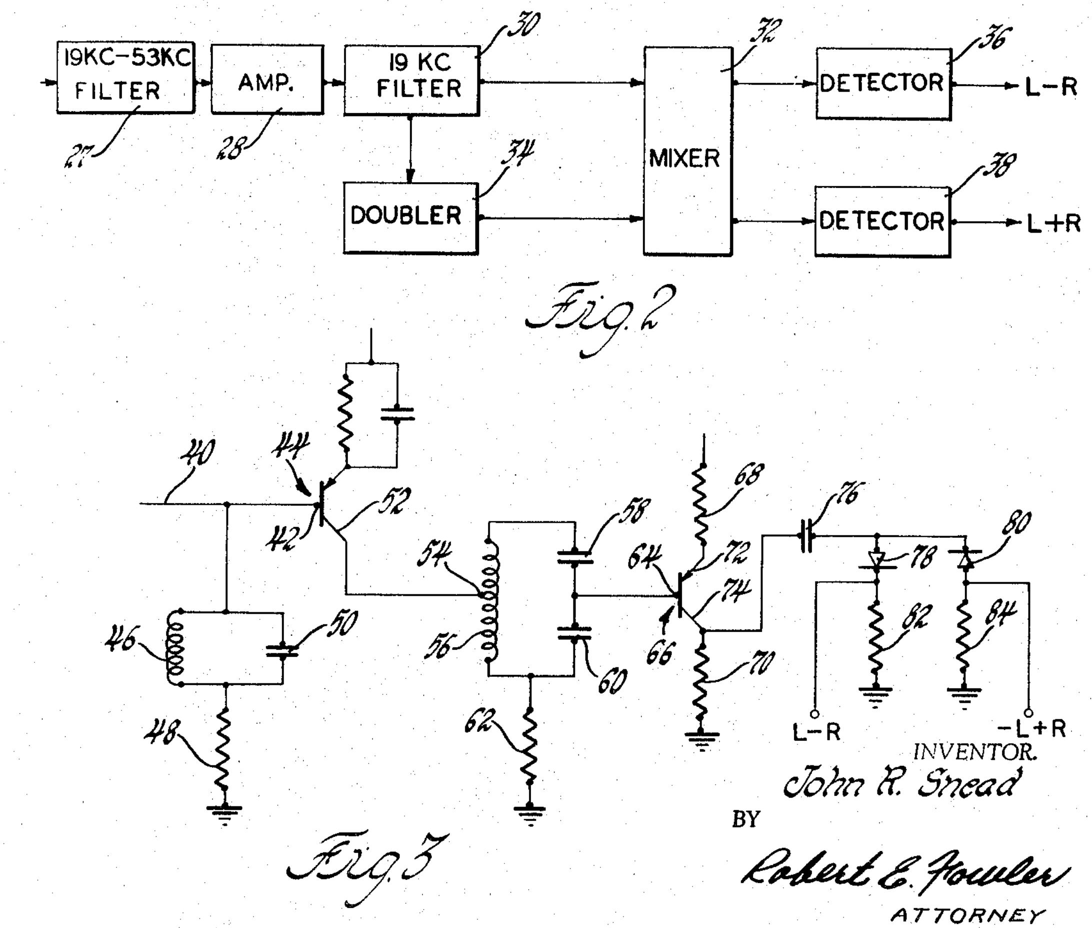
FIG. 2 is a block diagram illustrating my simplified stereo multiplex recovery system.
FIG. 3 is a circuit diagram of the stereo doubler and recovery circuit of my invention.

The present invention resides in simplifying that portion of the receiving system shown enclosed within the dashed lines of FIGURE 1. When the present invention is used filter 8 is deleted from the circuit. By the specific circuit shown in FIGURE 3 all of the functions of the 19 kc. filter 6, frequency doubler 10 and mixer section 12 are provided. FIGURE 2, therefore, illustrates in block diagram form the functions performed by the circuit shown. The circuit of FIGURE 3 performs all the functions of block diagram FIGURE 2 except that of an overall 19 kc.–53 kc. filter which is shown in FIGURE 2 as filter 27. Such filter will be necessary with the present invention. It will pass frequencies from 19 kc. to 53 kc. inclusive and is connected directly to the amplifier 28. The amplifier section 28 supplies a signal to the 19 kc. filter 30 and then to a mixer section 32. The 19 kc. filter section 30 is also coupled to a frequency doubler 34 which is fed into the mixer unit 32. The output of the mixer unit 32 as before is fed to a pair of detector sections 36 and 38 for detecting right and left programs.

FIG. 3 is a specific circuit diagram of a circuit performing all of the functions shown in FIG. 2 from the amplifier 28 on. In FIG. 3 the output from the 19 kc. to 53 kc. filter 27 is applied to line 40 which is directly connected to the base 42 of a transistor 44. An inductance 46 is connected in series with a resistor 48 between line 40 and ground. Condenser 50 is connected in shunt with inductance 46 to provide a high impedance resonant circuit tuned to 19 kc. and acting as a circuit to emphasize 19 kc. over the other input frequencies. The signal appearing at this point is a composite one consisting of amplified 19 kc. pilot and 38 kc. sidebands. The collector electrode 52 of transistor 44 is connected to a tap 54 on inductance 56. Two condensers 58 and 60 are connected in series across the inductance 56 to form a frequency doubling section resonant to 38 kc. The lower terminal of the inductance 56 is connected to ground through resistance 62 which is the collector load for transistor 52. All other frequencies from 23 kc. to 53 kc. appear amplified across resistance 62. The doubled 38 kc. signal appears across condenser 60 where it is reinjected in its sidebands so that it is mixed with the other signal frequencies. A point intermediate the two condensers 58 and 60 is connected directly to the base 64 of amplifying transistor 66. Here the signal now consists of the 19 kc., the harmonics of the 19 kc. and the 38 kc. sidebands. The frequency doubling action appears because of the harmonic generation of transistor 44. Biasing resistor 68 and load resistor 70 are connected to the emitter 72 and collector 74, respectively, between a source of voltage and ground. The base bias resistors have been omitted for simplicity. The collector 74 is coupled through condenser 76 to a pair of rectifier detectors 78 and 80 which are connected in inverse relation to detect the difference signals. Rectifier-detector 78 is connected to ground through a resistance 82 across which one detected signal is developed which may be identified as L—R. Similarly rectifier-detector 80 is connected to ground through resistance 84 across which a detected signal equivalent to —L+R is developed. This circuit, therefore, includes a 19 kc. filter section at 46–50, a frequency doubler section at 44–56–58–60, to reinsert the 38 kc. subcarrier into its sidebands, an amplifier section at transistor 44 stage and a mixer section at the output of the doubler. The two output signals from detectors 78 and 80, of course, are then added as shown in FIG. 1 to an amplified L+R signal to develop the final L and R output signals.

What is claimed is:

A signal amplifying and detecting system for detecting a plurality of separate signals for use in stereo reproduction from a single carrier transmission wave having a first modulated signal in one portion of the frequency spectrum, a second modulated signal including sideband modulation in a portion of the frequency spectrum spaced from the first leaving a frequency gap and a pilot signal in said gap for providing a sideband reference wave comprising a first amplifying stage consisting of a first transistor having an input circuit and an output circuit, a signal input system connected to said first transistor input circuit and having said single carrier transmission wave thereon, a parallel high impedance tuned circuit connected between the signal input system and ground tuned to the pilot signal frequency to amplify the same over other frequencies in the incoming wave, a tapped impedance coil, said transistor output circuit being connected to said tap on said coil, a pair of condensers in series connected in parallel across said impedance, a resistance connected from a point intermediate said impedance and one of said condensers to ground across which a signal including all of the amplified frequencies is developed, said impedance and condensers acting as a frequency doubler to double the pilot signal frequency and develop it across one of the condensers and reinject it in said sidebands, a further output line connected between the two condensers, a second amplifying transistor having an input circuit on which all the amplified modulated signals appear and an output circuit, said second transistor input circuit being connected to the further output line from the first transistor, and detecting means to develop rectified output signals to mix with others for stereo output connected to the output circuit for the second amplifying means.

References Cited by the Examiner

UNITED STATES PATENTS

| | | | |
|---|---|---|---|
| 3,233,044 | 2/1966 | Hopper | 179—155 |
| 3,264,413 | 8/1966 | Merritt | 179—15 |

DAVID G. REDINBAUGH, *Primary Examiner.*

R. L. GRIFFIN, *Assistant Examiner.*